(12) United States Patent
Sherman et al.

(10) Patent No.: US 7,194,510 B2
(45) Date of Patent: *Mar. 20, 2007

(54) MAINTAINING A SLIDING VIEW OF SERVER-BASED DATA ON A HANDHELD PERSONAL COMPUTER

(75) Inventors: Roman Sherman, Bellevue, WA (US); David C. Whitney, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 569 days.

This patent is subject to a terminal disclaimer.

(21) Appl. No.: 10/666,630

(22) Filed: Sep. 18, 2003

(65) Prior Publication Data

US 2004/0059791 A1    Mar. 25, 2004

Related U.S. Application Data

(63) Continuation of application No. 09/352,279, filed on Jul. 13, 1999, now Pat. No. 6,647,409.

(51) Int. Cl.
G06F 15/16 (2006.01)
(52) U.S. Cl. ..................................................... 709/203
(58) Field of Classification Search ................ 709/202, 709/203, 206, 207
See application file for complete search history.

(56) References Cited

U.S. PATENT DOCUMENTS 5,862,452 A    1/1999    Cudak et al. ................ 455/6.3
6,034,963 A    3/2000    Minami et al. ............. 370/401
6,058,106 A    5/2000    Cudak et al. ................ 370/313
6,088,337 A    7/2000    Eastmond et al. .......... 370/280
6,275,850 B1   8/2001    Beyda et al. ................ 709/206

Primary Examiner—David Y. Eng
(74) Attorney, Agent, or Firm—Merchant & Gould P.C.

(57) ABSTRACT

A handheld client computing system selectively retrieves items, such as email messages, from a server through either a POP transport or an IMAP transport and selectively maintains the items on the client. The retrieval and maintenance is based on predetermined criteria, such as predetermined date, size or keyword information. Initially, the H/PC (handheld personal computer) downloads item identification information from the server on the client/server network and determines which items are not present on the H/PC. Those items located on the server and not on the H/PC are selected for possible downloading to the H/PC. However, before each item is downloaded to the H/PC in its entirety, the H/PC downloads only the header of the selected item. The header information is analyzed to determine whether to download the entire item based on predetermined criteria, such as date information. Once all server-based items are analyzed, and selected items are downloaded, all local copies of items, that do not satisfy the predetermined criteria, are deleted to maintain a sliding or selective view of the server-based items belonging to the client account.

10 Claims, 8 Drawing Sheets

MAINTAINING A SLIDING VIEW OF SERVER-BASED DATA ON A HANDHELD PERSONAL COMPUTER

CROSS-REFERENCE TO RELATED APPLICATIONS

The present application is a continuation application under 37 CFR § 1.53(b) of application Ser. No. 09/352,279, filed on Jul. 13, 1999, entitled MAINTAINING A SLIDING VIEW OF SERVER BASED DATA ON A HANDHELD PERSONAL COMPUTER, now U.S. Pat. No. 6,647,409, and is hereby incorporated by reference.

TECHNICAL FIELD

The present invention relates to handheld computers and more specifically to messaging software running on the handheld computer controlling the interaction between a handheld computer and a server computer.

BACKGROUND OF THE INVENTION

Communications between a handheld PC (H/PC) and an email server are governed by a predefined protocol which outlines a number of restrictive rules and guidelines. Protocols are established to allow effective communications between email servers and the many different computer systems. The user of the client computer system, which communicates with a particular email server, must know or determine the protocol employed by that server. The client computer is configured such that all requests delivered to that server conform to the rules of the protocol.

Many email servers use what is known as the Post Office Protocol (POP). In general, POP is a simple, rudimentary email protocol designed primarily to facilitate transferring or downloading of email messages from the server to the client and allowing the client to delete email messages on the server. Consequently, the POP protocol does not provide extensive manipulation operations of email messages located on the POP server, i.e., the server using the POP protocol.

Another common email communications protocol is known as the Internet Message Access Protocol (IMAP). IMAP is a protocol that is similar to POP in that it also allows for the downloading of email messages from an email server to a client computer and the deleting of email messages located on the email server by the client computer. However, IMAP also provides more features to the client, permitting the client to manipulate the email messages in various ways while the email is still on the IMAP server. As an example, IMAP allows the client to search through email messages by keyword or by date, and then download selected email messages based on the search. POP does not have such searching capabilities, let alone selective downloading based on a search.

Each email server generally operates according to only one of the protocols, POP or IMAP, and the end user must therefore configure the client computer to operate according to the particular protocol used by the server.

The amount of memory available for use by the H/PC is typically considerably less than relatively large desktop PCs that typically hold substantially more memory, both operational memory and long-term storage memory. The memory constraint significantly impacts the amount of data that can be downloaded to and stored on the H/PC during a communications session. As a result, it may be possible to download too much data at one time, which could potentially consume all the available memory and cause significant problems related to functionality and performance. Email provides unique risks with respect to potentially downloading too much information during a particular session because the sizes of email message are unpredictable and may be quite large. For example, each email message may include various attachments in addition to the email message text wherein the attachments are electronic files that may potentially be extremely large and consume large quantities of storage memory. In addition to size, a particular user may receive an excessive number of email messages between sessions that could potentially consume significant storage memory.

Considering the unpredictable nature of email communications with respect to attachments and the potentially large number of email messages, it may be impractical to download every email message to the H/PC during a session. However, most users receive certain email messages that are typically more important than others, and in essence, the user is more concerned about some email messages than others such that all email generally does not have to be downloaded during each session. As an example, a particular user may be less concerned about downloading email messages that have been read or email messages that are outdated and stale. Alternatively however, the user may demand that the most recent, unread email messages be downloaded during each session. Additionally, the user may not be concerned with keeping old local copies of email messages, whether they have been read or unread, once the messages have become outdated and stale. These old messages tend to consume memory unnecessarily.

Depending on the protocol used during a connect session between the H/PC and the server, the H/PC may be able to effectively control the amount and number of email messages downloaded during a session. Using IMAP for example, the user may simply request only the email messages that have been received by the server within a particular date range, e.g., the last couple of days. Unfortunately, POP does not provide this capability, such that users communicating with POP servers may not be able to selectively download email messages. Additionally, neither the POP or the IMAP protocols automatically maintain or control the existing files on the H/PC to avoid the buildup of stale email messages on the H/PC.

Implementing some type of selective download and deletion regime on the server may jeopardize the ability of the client user to download particular files that may have become stale. Moreover, the user does not have control over the email server, which is typically in a remote location and managed by another person. Therefore, techniques implemented in desktop PCs, which the user can control to selectively download information, generally do not apply to transporting the information directly from the server to the H/PC.

It is with respect to these and other considerations that the present invention has been made.

SUMMARY OF THE INVENTION

The present invention solves the above and other problems by selective retrieval by a client of items, such as email messages, from a server through either a POP transport or an IMAP transport and the selective maintenance of items on the client. The retrieval is based on predetermined criteria, such as predetermined date, size or keyword information. Yet another aspect of the present invention relates to the operating system of the invention being configurable by the user with respect to predetermined criteria, according to which the items are selectively retrieved.

The present invention achieves these and other aspects by executing a number of computer operations during a time of connection between the H/PC and the server, i.e., a connect session. Initially, the H/PC downloads preliminary information from the server on the client/server network and determines which items are not presently on the H/PC. Those items located on the server and not on the H/PC are selected for downloading to the H/PC. However, before each item is downloaded to the H/PC in its entirety, the H/PC downloads only the header of the selected item. The header information, or secondary information, is analyzed to determine whether to download the entire item based on predetermined criteria such as date information. Once all server-based items are analyzed, and selected items are downloaded, all local copies of items, that do not satisfy the predetermined criteria, are deleted to maintain a sliding or selective view of the server-based items belonging to the client account.

As a further feature of the invention the ability to limit the number of downloaded e-mail messages is provided for either a POP server or an IMAP server. With respect to the POP server, the invention limits the e-mail messages the H/PC will accept since the POP does not provide such selectivity. With respect to the IMAP server, the invention verifies the selectivity in downloading since IMAP provides selectivity in downloading e-mail messages.

A more complete appreciation of the present invention and its scope may be obtained from the accompanying drawings, which are briefly described below, from the following detailed descriptions of presently preferred embodiments of the invention and from the appended claims.

DETAILED DESCRIPTION OF THE INVENTION

Figure 1:
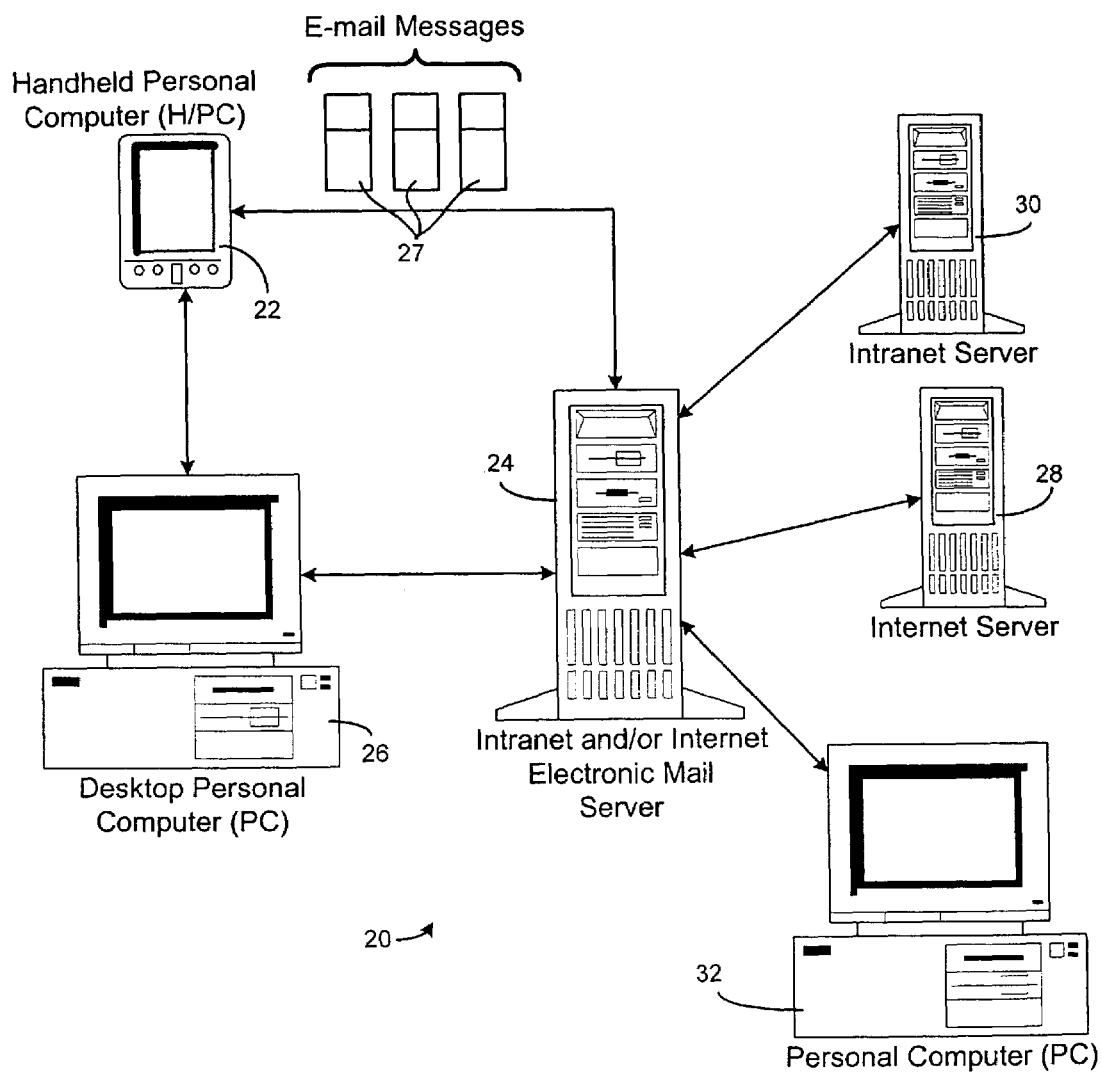
FIG. 1 is a pictorial representation of a client/server computer network incorporating an email server computer connected to a handheld client computer incorporating the present invention.

A client/server network system 20 comprising a client computer system 22, which is connected to a server computer system 24, is shown in FIG. 1. The client computer system 22 is preferably a portable handheld personal computer (H/PC) comprising an operating system capable of carrying out the steps of the present invention. The client computer system 22 may also be a palm sized computer or some other small computing platform not typically identifiable as a 'desktop' computer.

The computer system or H/PC 22 is also connectable to a desktop personal computer (PC) 26 as a companion device, wherein the desktop PC connects to the server 24. The server 24 is either an Internet server or an Intranet server which sends and receives electronic items such as electronic mail messages (email) 27, through various connections or gateways to other computer systems, such as an Internet email server 28, an Intranet server 30 and/or another desktop PC 32. The server 24 receives email messages from the other computing systems 28, 30 and 32 and stores these email messages for the user of the H/PC 22 and the PC 26 in an account dedicated to that user.

The email server communicates with the various computers 22, 26, 28, 30 and 32 using specific protocols, i.e., rules governing the type and form of communications. The email server may communicate with the H/PC 22 using either the Post Office Protocol (POP) or the Internet Message Access Protocol (IMAP) or some other protocol. As discussed in the background section above, POP is rudimentary and offers few operational features to the user. IMAP offers more features in communication between a client device and the network server device.

The H/PC 22 has software which selectively retrieves server-based items such as the email messages 27, based on predetermined criteria from the server computer system 24 and deletes local copies of items based on the same predetermined criteria. The email software is capable of both selectively retrieving email messages from a POP server based on predetermined criteria and exploiting the selective retrieval capabilities of the IMAP when communicating with an IMAP server. The email software is also capable of managing the local copies of email messages on the H/PC to remove copies not satisfying the predetermined criteria.

Figure 2:
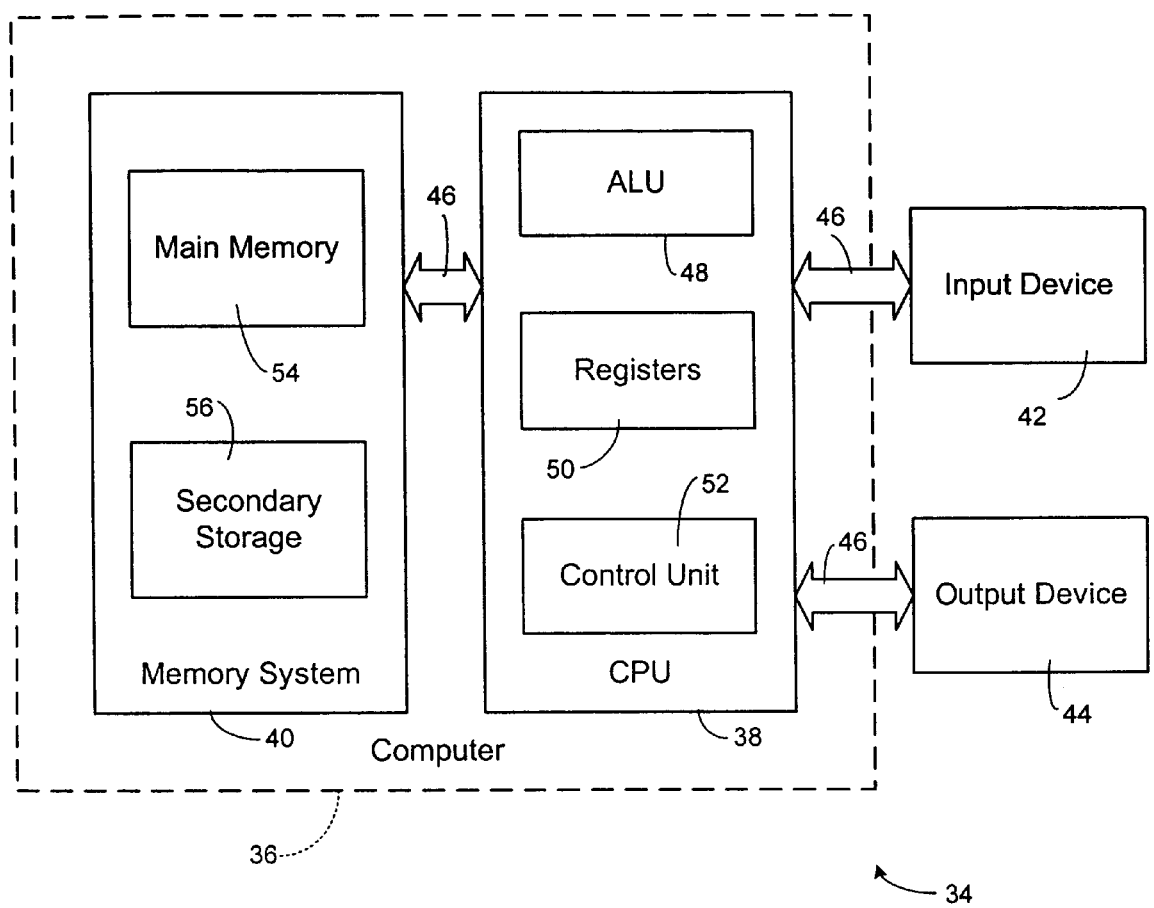
FIG. 2 shows the handheld computer system of FIG. 1 that may be used to implement a method and apparatus embodying an improved email software application of the present invention.

FIG. 2 and the following discussion under this subheading are intended to provide a brief general description of a suitable computing environment in which the invention may be implemented. Although not required, the invention is described in the general context of computer executable instructions of programs being executed by the H/PC 22. Generally, programs include routines, programs, objects, components, data structures, etc. that perform particular tasks or implement particular abstract data types. Moreover, those skilled in the art will appreciate that the invention may be practiced with other computer system configurations, such as laptop PCs, desktop PCs, multiprocessor systems, micro-processor based or programmable consumer electronics, network PCs, mini computers, main frame computers and the like. The invention may also be practiced in distributed computing environments where tasks are performed by remote processing devices that are linked through a communications network in a distributed computing environment, programs may be located in both local and remote memory storage devices.

The H/PC (FIG. 1) incorporates a system 34 of resources for implementing an embodiment of the invention as shown in FIG. 2. The system 34 incorporates a computer 36 having at least one central processing unit (CPU) 38, a memory system 40, an input device 42, and an output device 44. These elements are coupled by at least one system bus 46.

The CPU 38 is of familiar design and includes an Arithmetic Logic Unit (ALU) 48 for performing computations, a collection of registers 50 for temporary storage of data and instructions, and a control unit 52 for controlling operation of the system 34. The CPU 38 may be a microprocessor having any of a variety of architectures including, but not limited to those architectures currently produced by Intel, Cyrix, AMD, IBM and Motorola.

The system memory 40 comprises a main memory 54, in the form of media such as random access memory (RAM) and read only memory (ROM), and may incorporate a secondary storage 56 in the form of long term storage mediums such as hard disks, floppy disks, tape, compact disks (CDs), flash memory, etc. and other devices that store data using electrical, magnetic, optical or other recording media. The main memory may also comprise video display memory for displaying images through the output device 44, such as a display device. The memory can comprise a variety of alternative components having a variety of storage capacities such as magnetic cassettes memory cards, video digital disks, Bernoulli cartridges, random access memories, read only memories and the like may also be used in the exemplary operating environment. Memory devices within the memory system and their associated computer readable media provide non-volatile storage of computer readable instructions, data structures, programs and other data for the computer system.

The system bus may be any of several types of bus structures such as a memory bus, a peripheral bus or a local bus using any of a variety of bus architectures.

The input and output devices are also familiar. The input device can comprise a keyboard, a mouse, a microphone, a touch pad, a touch screen, etc. The output devices can comprise a display, a printer, a speaker, a touch screen, etc. Some devices, such as a network interface or a modem can be used as input and/or output devices. The input and output devices are connected to the computer through system buses 46.

The computer system further comprises an operating system and usually one or more application programs. The operating system comprises a set of programs that control the operation of the system 34, control the allocation of resources, provide a graphical user interface to the user, facilitate access to local or remote information, and may also include certain utility programs such as the email system. An application program is software that runs on top of the operating system software and uses computer resources made available through the operating system to perform application specific tasks desired by the user. The email system in a preferred embodiment of the invention is embodied in an application program. Alternatively, the email system may be integrated into the operating system. Exemplary operating systems in which the email system may be integrated with include Microsoft Corporation's Windows CE operating system for handheld personal computers.

The logical operations of the various embodiments of the present invention are implemented (1) as a sequence of computer implemented steps running on a computing system and/or (2) as interconnected machine modules within the computing system. The implementation is a matter of choice dependent on the performance requirements of the computing system implementing the invention. Accordingly, the logical operations making up the embodiments of the present invention described herein are referred to alternatively as operations, steps or modules.

Figure 3:
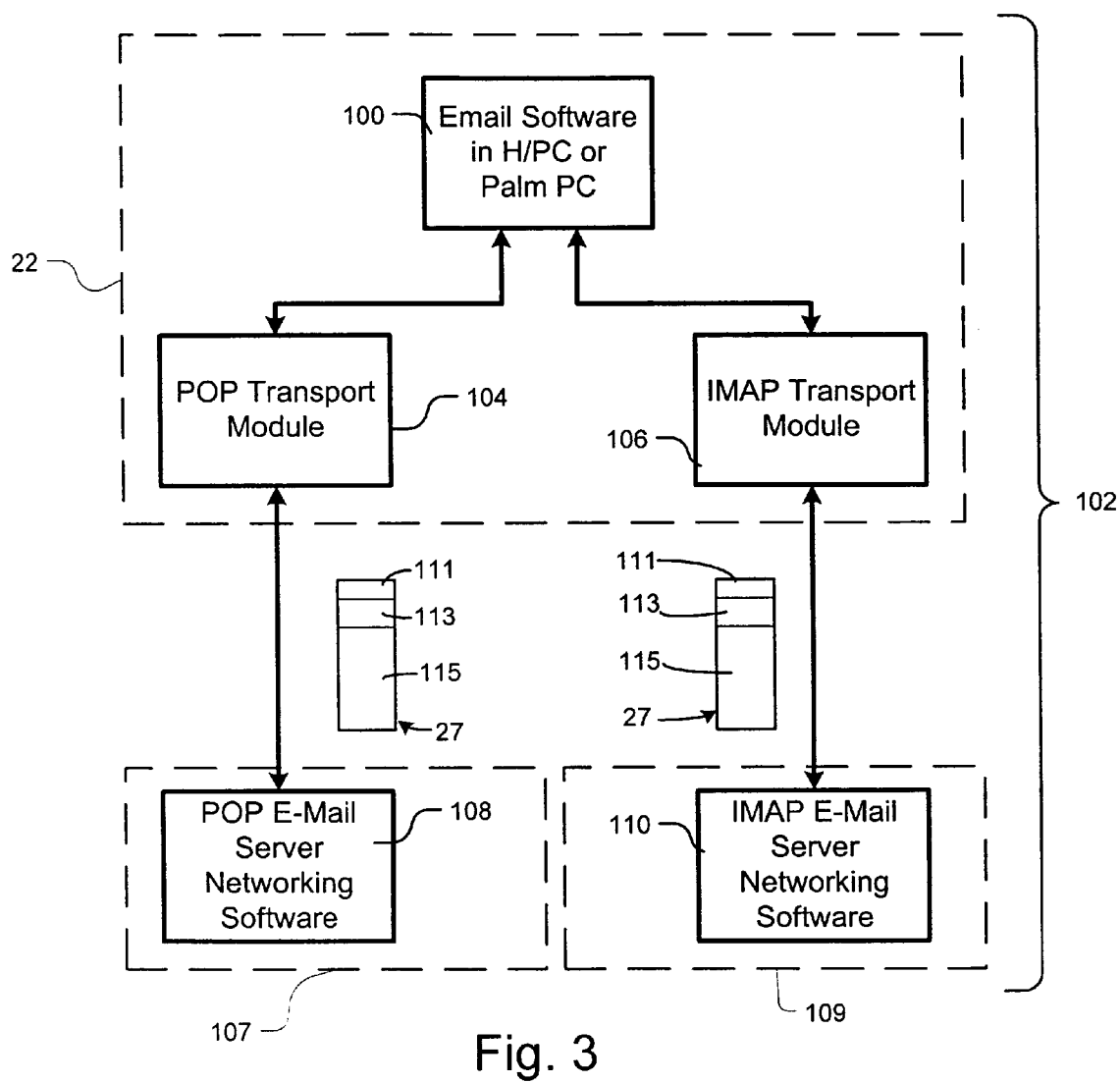
FIG. 3 shows the software environment of the client/server network shown in FIG. 1; the environment including the email software of the present invention, a POP module and an IMAP module and networking software located on the email server shown in FIGS. 1 and 2.

In a preferred embodiment of the present invention illustrated in FIG. 3, the email software 100 is a separate application running on top of the operating system such as the Microsoft Windows CE operating system running on the H/PC 22 (FIG. 1). The email software 100 works with communication software known as transport modules. One module is a POP transport module 104 and another is an IMAP transport module 106. The POP transport module 104 is a network communications program designed specifically to communicate with POP communications software 108 located on a POP email server 107. POP server 107 is a particular embodiment of the server 24 (FIG. 1). Alternatively the email software 100 communicates with the IMAP transport module 106 which is a network communication program designed to communicate with IMAP software 110 on an IMAP email server 109. IMAP server 109 is another embodiment of the server 24 (FIG. 1). Depending on whether H/PC 22 is configured to communicate with server 107 or 109, transport module 104 or 106 is used. The user configures the H/PC to communicate based on their particular email account and the protocol employed by the email server. However, with respect to the email software 100, the requests, commands and responses are the same regardless of which transport module 104 or 106 is used.

The transport modules 104 and 106 provide a set of functions and a standard set of commands to be exploited by the email application 100. The email application 100 utilizes the specific/standard commands, such as "Get Message By Number," in communication with either the POP module 104 or the IMAP module 106. The modules 104 and 106 translate the standard commands to actual protocol commands. Other modules (not shown) may be created that operate using a different network protocol but receive and translate the same standard commands generated by the email application 100. It is then up to the module 104 or 106 to carry out the actual server communication.

The email software 100 sends command requests to the transport module 104 or 106 requesting actions be performed by the server 107 or 109. Such actions might be to return server based items such as email messages. When a request is received by the module 104 or 106, the module 104 or 106 converts the command into data signals that are sent to the email server 107 or 109 over the network connection. The email server 107 or 109 and its networking software 108 or 110 receives these data signals, compiles the signals, analyzes the signals and performs the requested operations in response to the signals. Once the server 107 or 109 performs the operations, the server returns information to the transport module 104 or 106 either acknowledging the operation was completed successfully or that an error occurred.

The response from the server also includes the data requested by the software 100. The response is in the form of data signals which are sent to the module 104 or 106 which compiles the data signals into a meaningful response and transports the response to the email software 100. The software 100 is then able to parse and use the response accordingly.

The subject of the requests from the software 100 to the server 107 or 109 relates to email messages 27. Each email message 27 is an electronic document that is made up of at least three elements, an identification element (ID) 111, header information 113, and a message body 115. The ID 111 is used internally by the H/PC 22 or the server 24 to identify the file and may be simple such as an integer or more complex such as a file name or other ID string. The header 113 has information about the email message 27 such as originator, addressee, time created and the subject of the email message 27. The header 113 may include other fields. The body 115 is the actual message created by the creator of the email message and may include text, graphics, other files or attachments.

Figure 4:
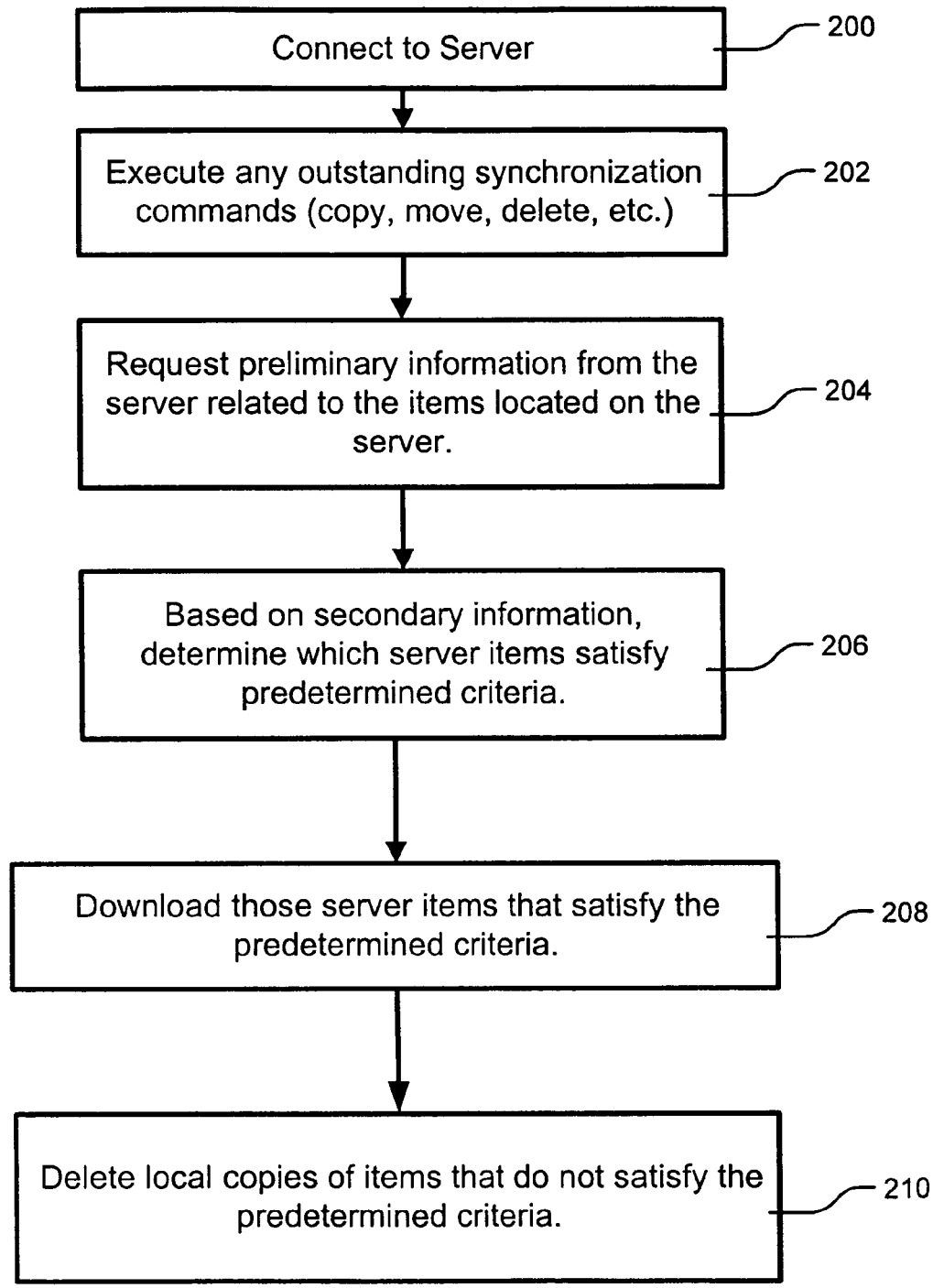
FIG. 4 is a flow chart demonstrating the logical operations executed by the email system of the present invention.

The logical operations performed by the email software 100 are shown in FIG. 4. The connect session begins at operation 200 which makes a connection with the email server 24. Typically an authorization stage/phase (not shown) occurs before any communication transactions occur. Following authorization, the synchronization operation 202 begins synchronizing the data.

The synchronization operation 202 executes a combination of commands referred to as outstanding synchronization commands. These commands are related to user initiated tasks performed by the user on the H/PC prior to the connect session to managing email messages on the H/PC 22. As an example, the outstanding commands would typically be those commands that the user executed on his existing files in between connections to the server such as any copy commands, move commands, or delete commands. The outstanding commands typically do not represent activities performed on the email server prior to the connection between the H/PC and the server.

Executing the outstanding synchronization commands at the beginning of a session insures that more storage space is available on the H/PC prior to any downloading of any new commands or files to the H/PC from the server. Preferably these commands are executed in the following order: copy, move and delete. Although this is preferably done automatically at the beginning of a session, this can be activated by the user or executed at a later time during the session in other embodiments.

In order to execute the outstanding synchronization commands, the email software 100 sends the command request to the transport module 104 or 106 which in turn communicates the command request to the server 107 or 109. The server software 108 or 110 receives the command request, executes the command, if able, and typically returns an acknowledgment that the command is complete, or returns an error response and returns requested information, if applicable.

Once all outstanding synchronization commands are complete, the software 100 continues with a request operation 204 which requests preliminary information from the server related to items located on the server. The server responds by returning a list of preliminary information wherein each element in the list relates to a particular item on the server. Importantly, the list of preliminary information received from the server does not consume substantial memory space on the H/PC 22.

As an example, a request may be made for a list of only the identification numbers (ID) related to each item on the email server that belongs to the user of the client H/PC. The transfer and storage of all the ID numbers does not consume significant memory space on the H/PC since each ID is relatively small compared to the size of the email message body. By not downloading the complete email record, i.e. ID, header, and body, of all the items on the email server for the client, the possibility that all memory in the H/PC will be consumed by the download is avoided.

Following the request for preliminary information, and receipt of the response containing the preliminary information, step 206 determines whether any of the items on the server satisfy a predetermined criteria for downloading. Once it is determined whether or not any of these items satisfy the predetermined criteria, download module 208 downloads those server items that satisfy the predetermined criteria. Following the download module 208, local copies of items that do not themselves satisfy the same predetermined criteria are deleted by deletion operation 210.

The above described operation flow provides a sliding view of server-based data on the H/PC 22. That is, the items present on the H/PC reflect only those items that satisfy a predetermined criteria. These criteria may change or "slide" to effectively provide a sliding view of the server-based data items to the user of client H/PC. The sliding view provides for significant memory conservation. Items that do not satisfy the criteria are not downloaded if they are on the server, and are deleted if they are on the H/PC. Thus, storage space in the H/PC is released for use by other resources or items.

Figure 5:
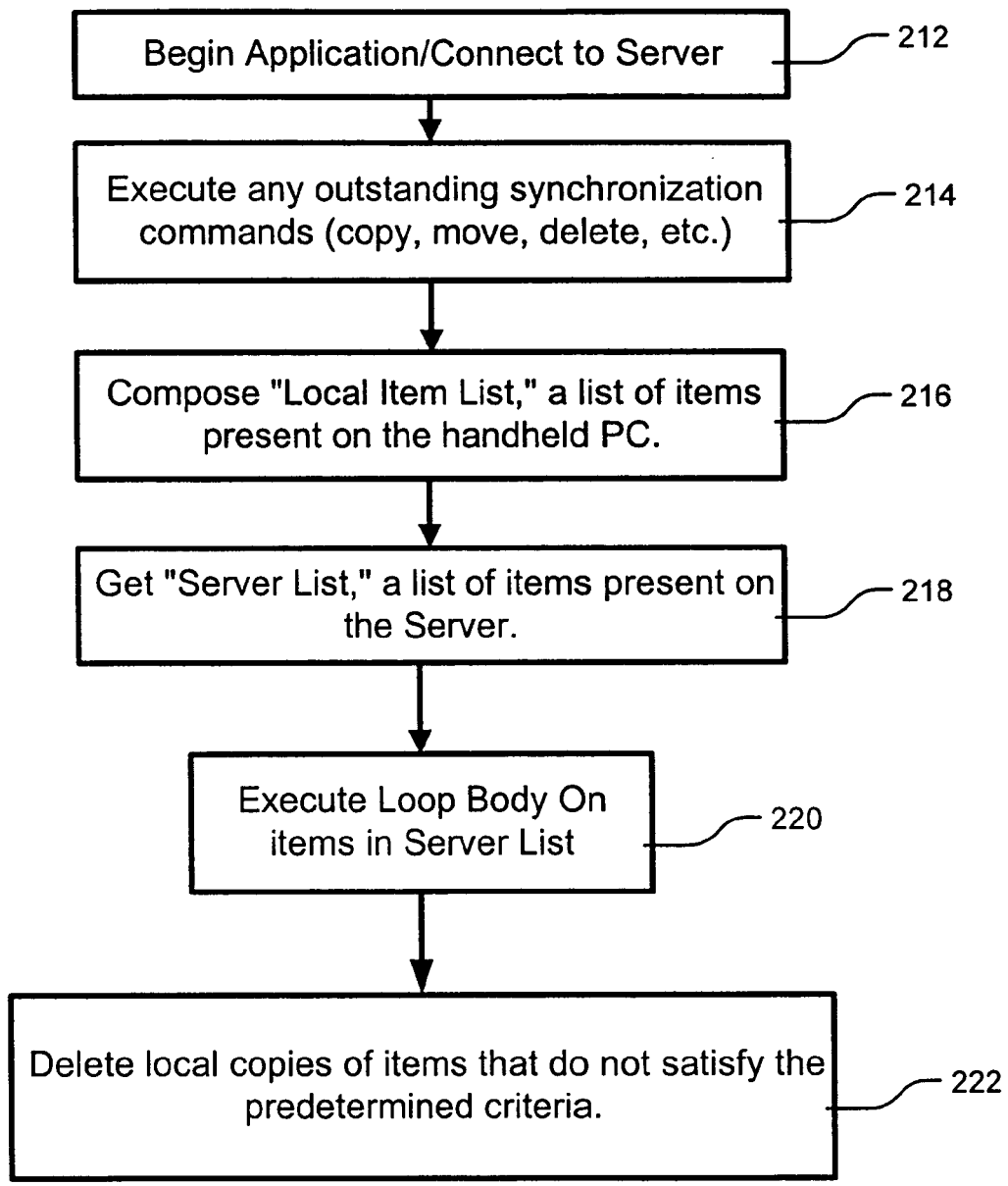
FIG. 5 is a flow chart representing, in more detail, logical operations shown in FIG. 4 executed by the email system of the present invention.
Figure 6:
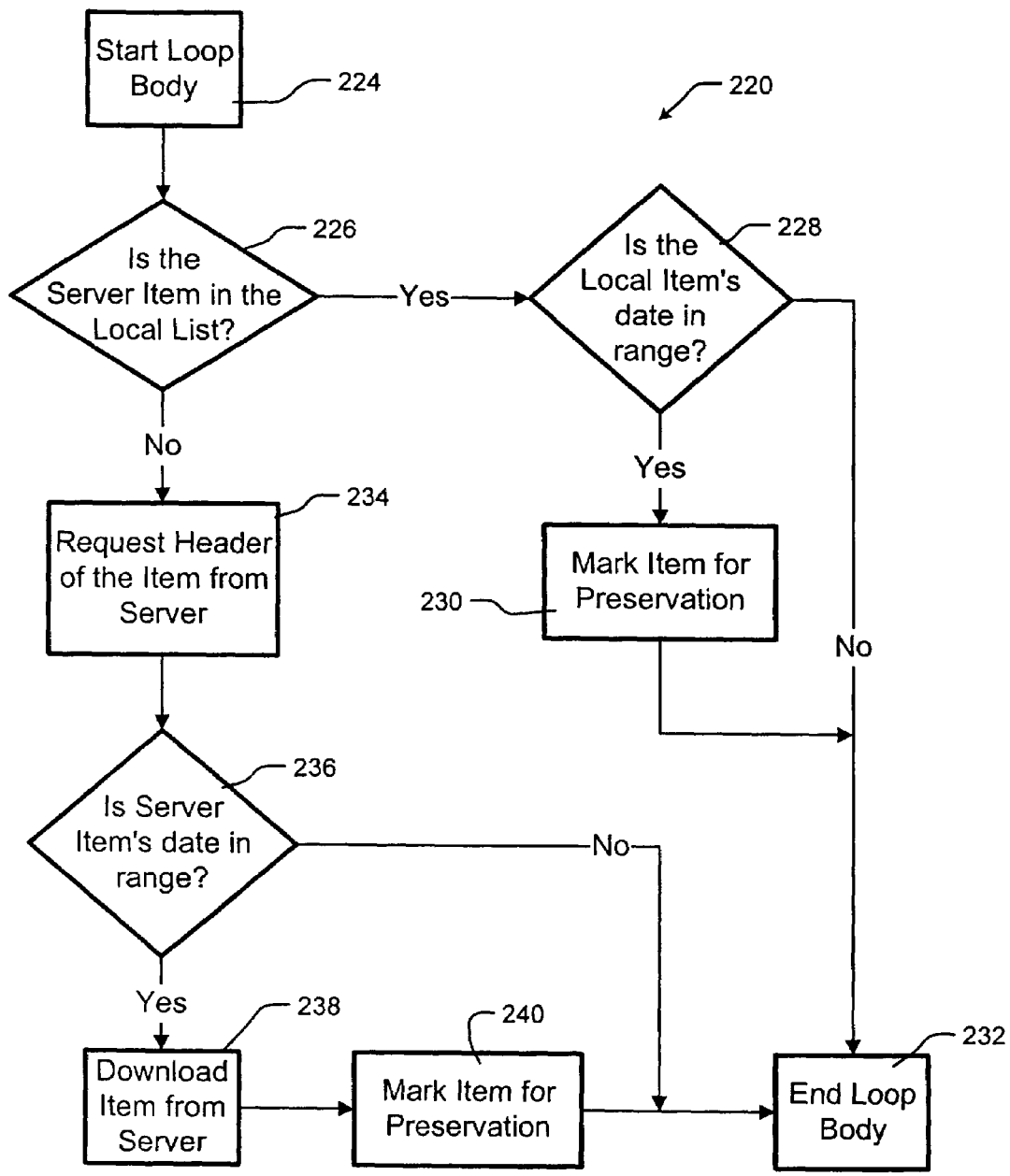
FIG. 6 is a flow chart depicting the logical operations of the analysis operation represented in FIG. 5.

More specific details of the logical operations depicted in FIG. 4 are illustrated in the operation flow charts shown in FIGS. 5 and 6. As shown in FIG. 5, the operation flow begins with a connection operation 212, which connects the H/PC to the server to begin the session. Also, once the connection to the server is made, and the session has begun, synchronization step 214 executes all outstanding synchronization commands. These commands are preferably executed in the copy, move, delete order as shown and described above in conjunction with FIG. 4.

Upon completion of all outstanding synchronization commands, compose operation 216 composes or generates a local item list. The local item list is a list of all items located on the H/PC. The list is stored in memory and used when needed. In an alternative embodiment, the local item list may be generated before connection to the server, but however, the list must be updated as outstanding synchronization commands are performed.

The local item list preferably contains only identification information or elements related to each item on the H/PC necessary to identify whether or not items on the server are different from those items present on the H/PC. The list preferably does not contain extraneous information so that memory is not unnecessarily consumed. In one embodiment, compose operation 216 gets or assembles all item identification numbers for each item on the H/PC 22.

Following creation of the local item list, get server list operation 218 gets a list from the server of items located on the server. Preferably, get server list operation 218 requests the email server to compose and return a list of all items located on the email server that satisfy the predetermined criteria. However, as will be discussed shortly below, the server may return a list of all items for the client or only those items satisfying the predetermined criteria. The server list that is returned to the client includes only the identification elements related to each item. The identification elements are the same type of elements collected in the local list such as identification numbers.

Of course, other identification elements could be employed. As an example, a name could be used as an identification element in both the local list and the server list. To save memory space, the features used for each list preferably comprise only enough information to uniquely identify each item.

Depending on the protocol used, the server list that get operation 218 retrieves may be filtered on the predetermined criteria. When communicating with a POP server 107 (FIG. 3), the server does not have filtering capabilities, and therefore, even though the request specifies the predetermined criteria for items on the server list, the server with POP transport simply returns a list of all items on the server for the client. However the IMAP server 109 has filtering capabilities and returns only the preliminary information for the items that satisfy the filter criteria, i.e., the predetermined criteria in the request from the get operation 218. Thus, the server list may be much smaller when communicating with an IMAP server 109.

Alternatively, the inclusion of predetermined criteria in the request from the client might be enabled or disabled by the user or email system depending on the transport protocol. In this alternative embodiment, when the request is through a POP transport, the predetermined criteria would be omitted from the request. However, when requesting the server list from an IMAP server 109, the request would include filter information, i.e. the predetermined criteria such as a date range.

Upon receipt of the server list, the execute module 220 executes the body of an operation loop shown in FIG. 6. Execute loop body module 220 analyzes the information in the local list and the server list to determine which items to download and which local items to preserve. With respect to the POP server, the execute module 220 limits the e-mail messages the H/PC will accept since POP does not provide such selectivity. With respect to the IMAP server, the execute module 220 can be thought of as a download verification of selectivity since IMAP provides selectivity in downloading e-mail messages.

Following completion of operations by the execute module 220 for each item on the server list, delete operation 222 deletes all local copies of items that do not satisfy the predetermined criteria. Delete operation 222 is logically similar to delete step 210 discussed above in conjunction with FIG. 4.

Additionally, in a preferred embodiment, operation 222 also deletes local copies of items that no longer exist on the server, i.e., those items that have been deleted from the server while the H/PC was not connected. Since operation 222 deletes all items not marked for preservation, operation 222 not only deletes the items that do not satisfy the predetermined criteria but also deletes local copies of items not on the server, if any such local copies exist. The step 222 therefore provides some synchronization between the H/PC and the server.

FIG. 6 illustrates the logical operations of the loop body executed by execute module 220 in FIG. 5. The loop body operation flow depicted in FIG. 6 is conducted separately for each item on the server list. Start loop body step 224 gets the next item from the server list and begins loop body operation flow. Initially, decision module 226 compares the server item identification element against the local item list of identification elements to determine whether the server item is already present on the H/PC 22. If it is determined that the server item identification element matches one of the identification elements on the local list, then operation flow branches YES to decision operation 228.

Decision operation 228 detects whether or not the local item satisfies the predetermined criteria, e.g., whether the date of the item is within the predetermined specified date range. Decision operation 228 essentially compares the date of the item, which is in the header of information related to that item, to the predetermined date range. Examining the header information does not require a request to the server since the item, header included, is present on the H/PC 22. The date range may be entered by the software program or configured by the user.

If the item's date is within range, the operation flow branches YES to mark item step 230, which marks the local item for preservation. If the date associated with the local item is not within the predetermined range, flow branches NO to end step 232 which effectively ends the loop body operation flow for that item. When the operation flow branches NO to end of loop body 232, the item is not marked for preservation meaning that the item will ultimately be deleted. Alternatively, the item could be marked for deletion, or simply deleted the moment decision operation 228 detects that the item does not satisfy the predetermined date requirement.

However, marking items for deletion or deleting items the moment decision operation 228 detects that the item does not satisfy the predetermined date requirement may not be preferred since local copies of the items that no longer exist on the server may not be deleted. In order to overcome this issue, all local items would have to be tested against the server item list to determine whether any local copies should be deleted as not being on the server.

If decision module 226 determines that the server item is not on the H/PC 22, i.e., the identification element for the server-based item does not match any of the identification elements on the local list, the operation flow branches NO from decision module 226 to request header operation 234. Request operation 234 requests the header from the server for the server-based item. In response, the server returns only the header for the item. The header contains information including the date the item was created. The requested header may also contain information related to the type of software used or other software program information.

Upon receiving the header information, decision operation 236 tests whether the date related to the server item satisfies the predetermined criteria as specified by the email software 100 or configured by the user. Decision operation 236 is similar to decision operation 228 since decision operation 228 also compares date information from the header of an item to the date range specified by the email software or by the user. However in operation 236 the actual item is not on the H/PC during the decision operation. Therefore, if the date related to the server item satisfies the specified date range, then operation flow branches YES to download body operation 238.

Download body operation 238 downloads the body of the item from the server to the H/PC. Download operation 238 involves a request from the H/PC to the email server. The request identifies the item using an identification element and requests the body of the item. Once a body of an item is downloaded, a local copy of the item exists on the H/PC. Mark step 240 marks the local copy of the item for preservation. Mark item step 240 is similar to operation 230 in that both steps 230 and 240 mark local items satisfying the date range criteria for preservation. Following the mark item step 240 for preservation, the loop ends and another item is analyzed or the operation flow executed by execute module 220 (FIG. 5) completes.

If decision operation 236 detects that the server item's date is not within the specified range then flow branches NO to end of loop body 232, ending the operational loop for the item, and the next item on the server list is analyzed beginning at step 224. Once a server item has been analyzed according to the loop body operational flow 220 shown in FIG. 6, the next server item on the server list is analyzed in a similar manner beginning at step 224. The loop body is executed for each item located on the server as identified in the server list.

Following analysis of all server-based items as identified on the server list, a list of items on the H/PC remains wherein some of the items are marked for preservation while others are not marked for preservation. Or, alternatively, some are marked for disposal and others are not marked for disposal. Using this list, delete operation 222 (FIG. 5) deletes all local copies of items not marked for preservation, or those items marked for disposal. Deleting local copies of items not satisfying the criteria following the download procedure frees up storage space and maintains a sliding view of server-based information on the H/PC 22. Of course, those items that have been moved from the email directory and saved in another location prior to the connect session are not deleted to thus allow the user to protect selected email messages. In an alternative embodiment, the software 100 prompts the user prior to deleting the local copies to insure that no copies are deleted which the user desires to maintain on the H/PC.

The above logical operations maintain on the H/PC only those items that are marked for preservation and thus only those items that satisfy a particular criteria. As discussed above, other criteria may also be used to selectively download items from the server. Maintaining a sliding view avoids undue storage consumption due to outdated or stale messages. Also, this email system eliminates the concern for downloading all email messages in one session, which might consume all the storage memory available on the H/PC 22.

Figure 7A:
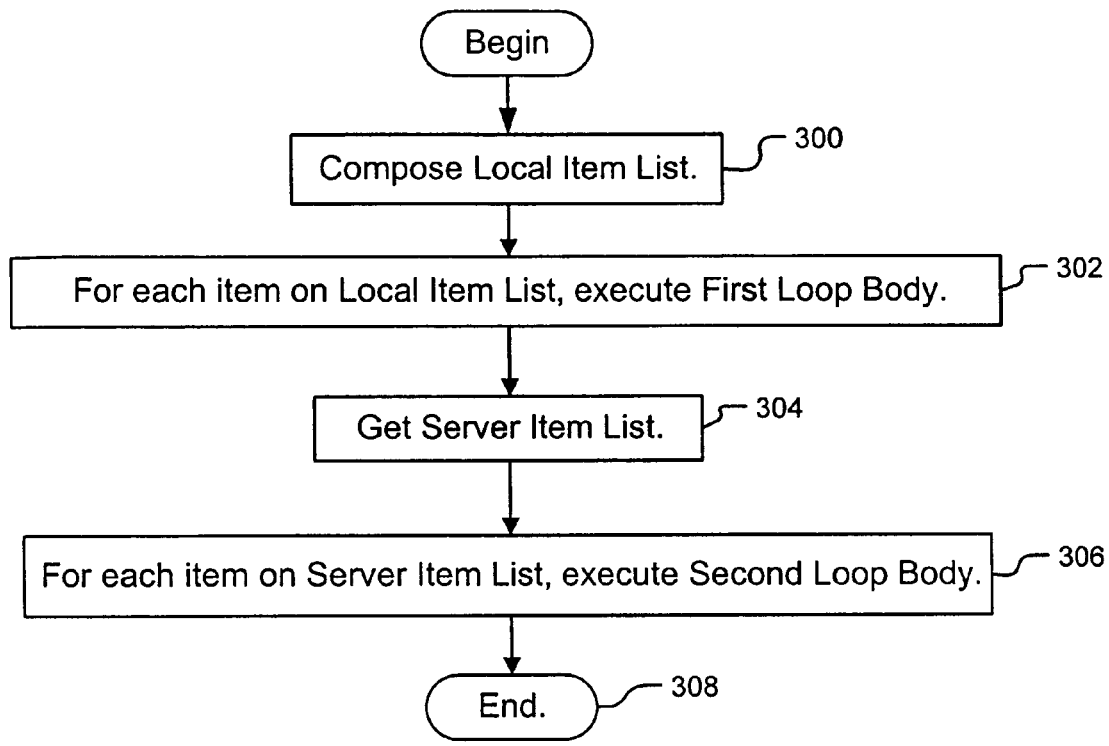
FIGS. 7a, 7b and 7c depict logical operations of an alternative embodiment of the present invention.
Figure 7B:
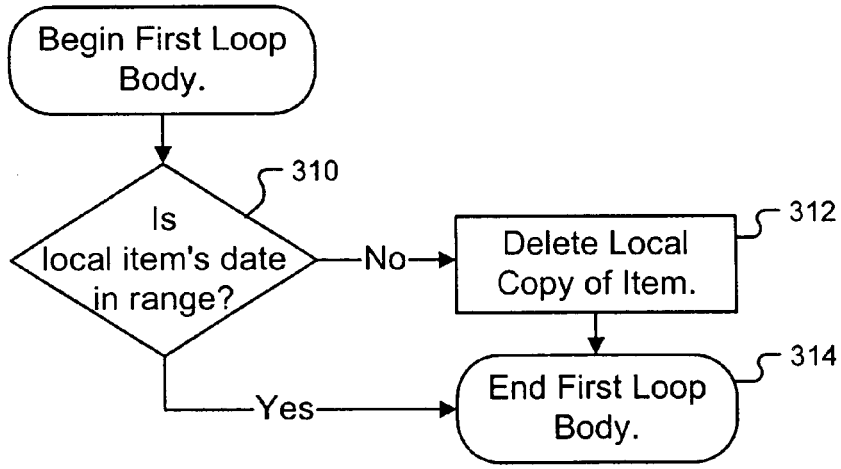
Figure 7C:
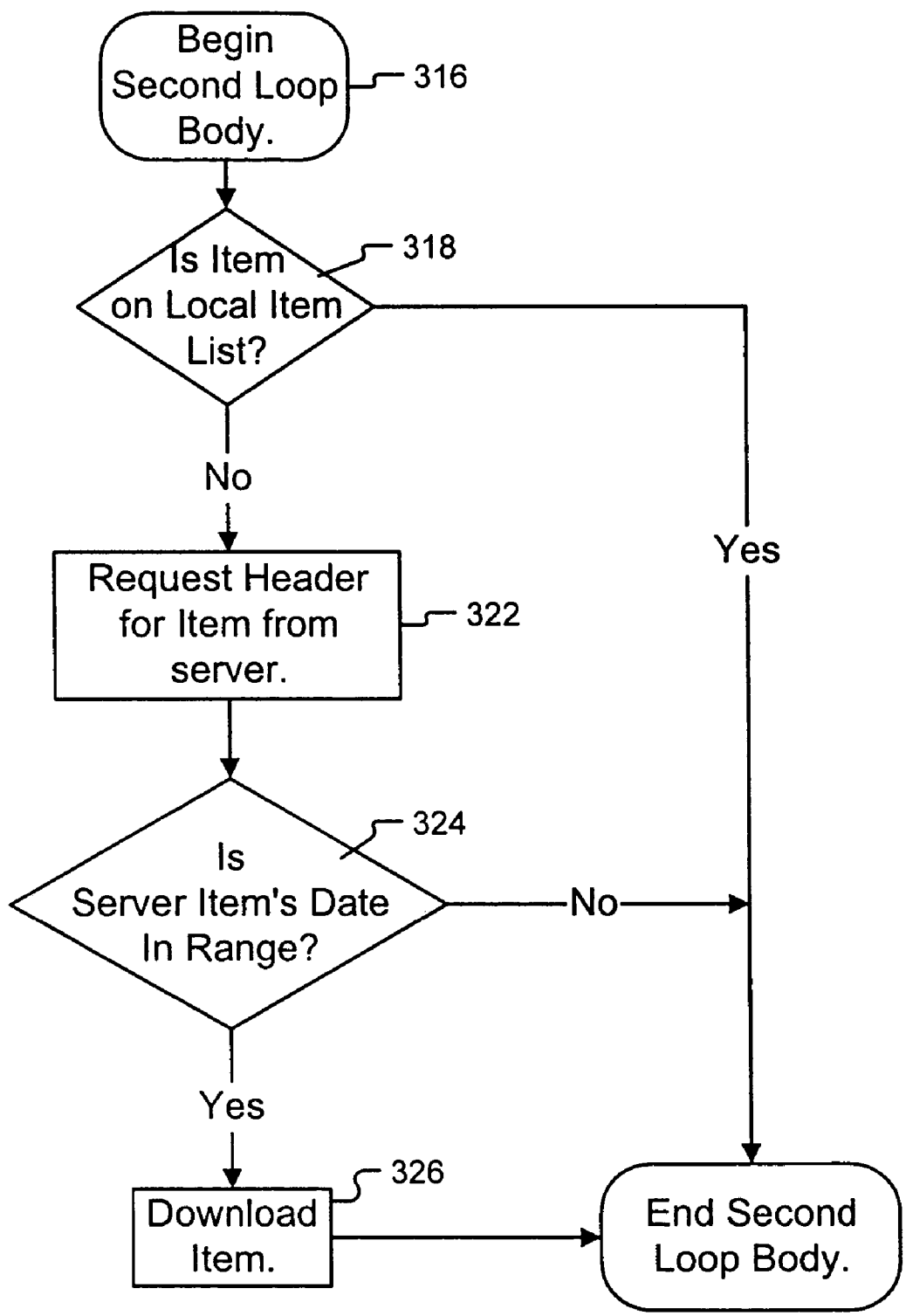

An alternative embodiment of the present invention is shown in FIGS. 7a, 7b and 7c. The overall program flow is depicted in FIG. 7a providing essentially four specific operations. The four specific operations are executed when a connect session has begun, and all synchronization commands are complete as discussed above for FIG. 4 and operation 202. The operation flow begins with compose local item list 300 which composes a list of items present on H/PC 22. Operation 300 gathers and compiles information related to each and every item on the H/PC 22 following synchronization operations.

Next, for each item on the local list the first loop body is executed at operation 302. Operation 302 can be summarized as an operation to find and delete local items that do not satisfy the predetermined criteria. Once the local item list has been generated by step 300, the necessary information is present on the H/PC to determine whether or not any of these items should be deleted before any other responses/communications are made with the server 24. In alternative embodiments, operation 302 is done prior to a connection with the server.

Next get server item list operation 304 gets the list of server-based items, i.e., items located on the server. Get server item list operation 304 is the same operation described above with respect to operation 218 (FIG. 4). Operation 304 requests from the server a list of preliminary information related to all items presently on the server, and the server returns the list of preliminary information related to each server item. Items are not downloaded in their entirety at this stage of the operation flow. Preferably this item list is simply a list of item identification elements that can be compared to the identification elements on the local list generated by operation 300.

Once the server list has been received from the server, module 306 analyzes each server item and determines whether the item satisfies the predetermined criteria. The operations performed by module 306 are very similar to operations noted above for operations 226, 234, 236 and 238. Operation 306 also incorporates downloading the body of the item if the item is determined to satisfy the predetermined criteria, i.e., the specified date range. Once module 306 operations are complete, the email system logical operations end at step 308.

FIG. 7b illustrates the logical operations of analysis module 302 shown in FIG. 7a. The process depicted in FIG. 7b begins with decision operation 310, which determines whether the date of the local item is within the specified range. Decision operation 310 is the same as decision block 228, FIG. 6. Operation 310 simply compares the local item header date information to the specified date range submitted by the software or the user. If the item satisfies the predetermined date criteria, operation flow branches YES to the end 314 of first loop body flow and the next local item can be analyzed.

If the date of the item does not satisfy the specified date range, flow branches NO and delete step 312 deletes the item and removes it from local item list. As a result, the local copy of the item does not consume space either in memory nor is the identification number for the item present on the local item list. Alternatively, the item's ID number may be kept on the local list to reflect the fact that the item has been analyzed with respect to the date to potentially avoid unnecessary header requests later in the process. Following deletion of the local copy, the first loop body ends at 314 for the item and the next item on the local list is analyzed in the same manner. This loop repeats for every item on the local item list generated by compose local item list operation 300.

FIG. 7c illustrates the logical operations of operation 306 (FIG. 7a). The operation flow depicted in FIG. 7c begins at step 316. First, comparison step 318 detects whether or not each server item on the server item list generated by get server item list 304 is on the local item list. If it is determined that an item is on the local item list, operation flow branches YES to the end 320 of the second loop body. At the end of the second loop body the next server item is selected from the list, and the loop body in FIG. 7c repeats to analyze the next item.

If it is determined, on the other hand, that the server item is not on the local item list, operation flow branches NO from comparison operation 318 to request header operation 322. The request operation 322 is the same as request operation 234 shown in FIG. 6. The H/PC 22 generates a request for only the header of a particular item. The server recognizes this particular type of request and responds by delivering the header information, which is then analyzed at operation 324. Analyze server item operation 324 compares the date within the header information to the specified date range. The specified date range is the same as the date range used by operation 310 (FIG. 7b). Also the specified date range is something specified either by the user or the email software itself.

If the server item's date is within the specified range, flow branches YES to operation 326 and the item is downloaded from the server. Download operation 326 is the last operation before the end of the second loop body, and the next server item on the server item list is then analyzed beginning at step 316. Of course, if there are no more items on the server item list then operation 320 ends execute module 306 (FIG. 7a).

A difference between the flow of operations shown in FIG. 7 and the operation flow shown in FIGS. 5 and 6 is the occurrence of the deletion operation. In operation flow of FIGS. 5 and 6, the local items not marked for preservation are deleted near the end of the operation flow. The local items that do not satisfy the predetermined criteria are deleted near the beginning of logical operations depicted in FIG. 7. Deleting local copies prior to server transactions potentially frees storage space in the H/PC 22 allowing more items to be downloaded without risk of consuming vital memory. Performance may increase since the local item list may shrink, decreasing the number of comparisons that need to be made with respect to the server list.

The scheme shown in FIG. 7, however, does not delete local copies of items that are no longer on the server, if any exist. If desired, synchronization of this type may be accomplished, following the selective download procedure shown in FIG. 7, by comparing local copies to the server items to determine which items should be deleted that are no longer on the server. As this particular embodiment requires an extra step to synchronize, it may not be the most efficient means to accomplish synchronization. However, it may be beneficial in cases where the H/PC is used as the primary email computer, which reduces the probability that any existing local copies are related to items that are no longer on the server.

Additionally, the process depicted in FIG. 7 may be inefficient in cases where the server contains many items that do not satisfy the predetermined criteria. In such a case, local copies of these items are deleted prior to the comparison stage. Consequently, more headers may be requested from the server and compared against the predetermined criteria in the H/PC. Since network time is currently more expensive than keeping potentially stale data over a short term, the scheme of FIG. 7 may not be preferred. However, this method may be preferred in situations where server items are regularly deleted and no additional headers would be requested or if network time was inconsequential in comparison to freeing up storage space.

In another embodiment of the present invention, the apparatus or process does not download a server-based item immediately upon determining that it is within the specified date range. In fact the item's header may be stored and used to display relative information to the user regarding the item until the user actually selects the item for viewing. Upon selection for viewing, the item may then be downloaded in its entirety from the server. Using this alternative embodiment allows memory space that would otherwise be consumed to remain free for use. If the H/PC is disconnected from the server, when the user desires to read an email the user will have to reconnect. Fixing this problem of reconnect may simply take the form of giving the user the option, prior to disconnecting from the server, to download all emails that have not been read.

With respect to this alternative embodiment is important that the header information disclose enough information related to the item to allow the user to select whether or not they want to download the item and read the item. For this reason the header information includes not only who sent the email message to the user but also a subject line. As an alternative, the header information may also include the first line of text of the email message.

Preferably, transport settings allow the user to specify how much of a message should be downloaded to the H/PC initially. The user chooses between downloading just a header, a complete message, or a specified number lines of the message. Also, the user can preferably elect whether to download attachments and schedule information that may be attached to an email message.

The above specification, examples, and data provide a complete description of the manufacture and use of the composition of the invention. Since many embodiments of the invention can be made without departing from the spirit and scope of the invention, the invention resides in the claims hereinafter appended.

The invention claimed is:

1. A method of maintaining a selective view of server based data on a client computer system, said method comprising:
    obtaining information related to items on the server;
    comparing the information for items on the server to information for items on the client computer system;
    analyzing the information for each item on the server that is not on the client computer system to determine whether the item satisfies predetermined criteria;
    downloading the items that satisfy the predetermined criteria to the client computer system; and
    deleting local copies of items that do not satisfy the predetermined criteria.

2. A method as defined in claim 1 wherein the step of obtaining information and the step of comparing further comprises:
    requesting identification elements for each item located on the server;
    comparing each identification element returned from the server to identification elements for items located on the client computer system; and
    requesting secondary information for each item on the server not found on the client computer.

3. A method as defined in claim 2 wherein the requested secondary information is header information.

4. A method as defined in claim 1 wherein the predetermined criteria are date information.

5. A computer program storage medium readable by a computing system and encoding a computer program of instructions for executing a computer process in an email system at a client computer, said computer process retrieving server email messages from an email server computer, said computer process comprising:
    getting a server list of message identification elements related to server email messages;
    determining whether any of the server email messages are on the client computer;
    retrieving header information for each server email message not on the client computer;
    analyzing the header information and determining whether the server email messages, that are not on client computer, satisfy the predetermined criteria; and
    downloading server email messages to the client computer that satisfy the predetermined criteria.

6. The computer storage medium of claim 5 wherein the computer process further comprises:
    testing whether local email messages on the handheld client computer satisfy predetermined criteria; and
    deleting local email messages that do not satisfy the predetermined criteria.

7. The computer storage medium of claim 5 wherein the computer process operation of determining further comprises:
    composing a local list of message identification elements related to email messages on the client computer; and
    comparing the message identification elements in the local list to the message identification elements in the server list to determine whether any server email messages are on the client computer.

8. The computer storage medium of claim 5 wherein the computer process begins by:
    composing a local list of message identification elements related to email messages on the client computer;
    testing whether local email messages on the local list satisfy predetermined criteria; and
    deleting local email messages, that do not satisfy the predetermined criteria, from the client computer.

9. Apparatus for maintaining a selective view of server based data on a client in a network of server and client computing systems, said apparatus in the client comprising:
    a compose module composing a local item list of local email identifiers identifying those email messages on the client;

a get module requesting a server list of server email identifiers identifying email messages on the server;

a compare module comparing server email identifiers to local email identifiers to determine whether a server email message on the server is not on the client;

header request module responsive to the compare module and getting header information from the server for each server email message not on the client;

test module detecting from the header information whether each server email message not on the client satisfies a predetermined criteria;

a retrieve module responsive to the test module and downloading to the client server email messages that satisfy the predetermined criteria; and a preservation module preserving on the client only local copies of server email messages that satisfy the predetermined criteria.

10. The apparatus of claim 9 wherein said get module comprises:

a transport module sending to the server a request for the server list and the predetermined criteria for downloading server email messages to the client; and a filter returning to the client only the server email identifiers for server email messages that satisfy the predetermined criteria.

* * * * *